United States Patent Office 3,192,132
Patented June 29, 1965

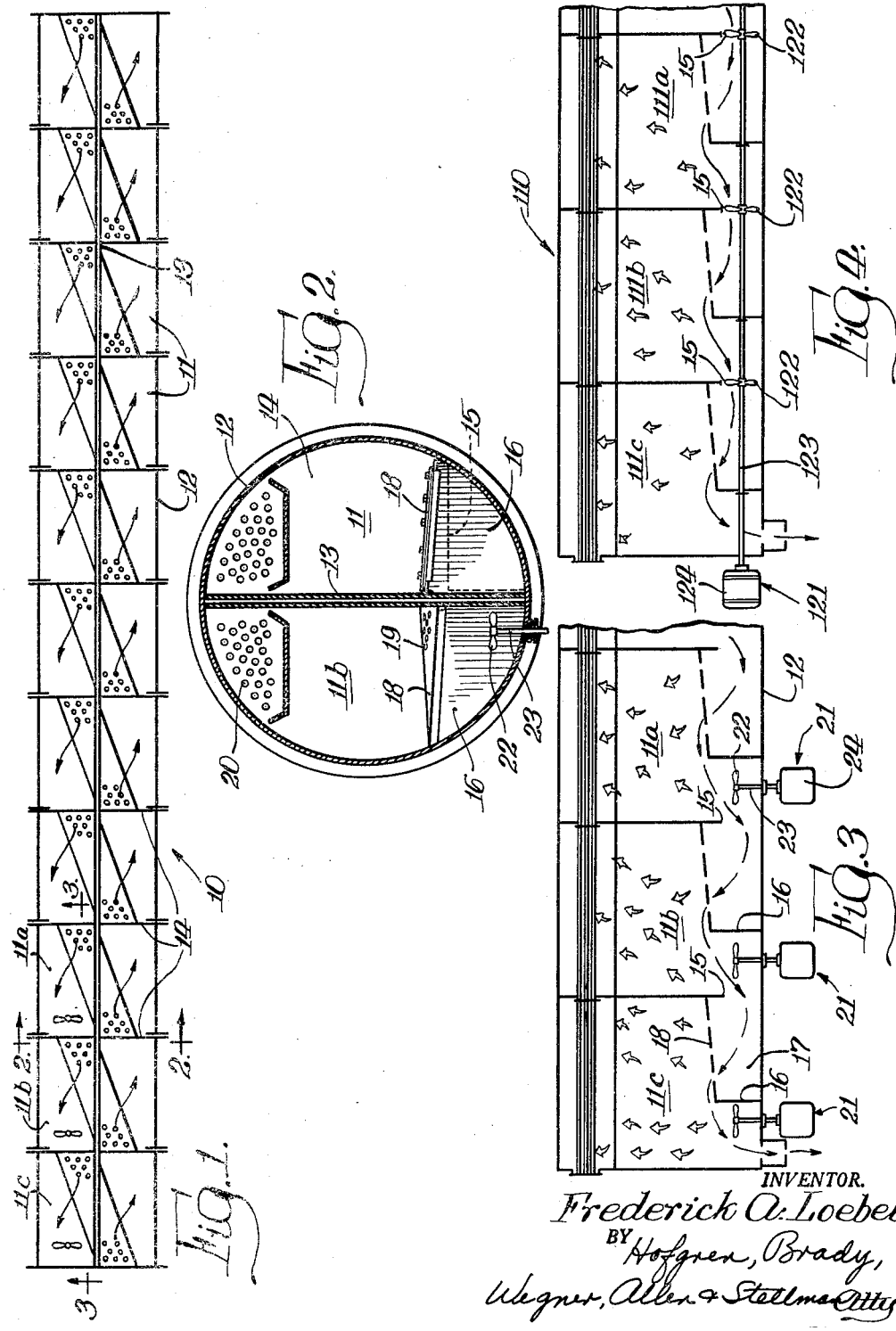

3,192,132
APPARATUS FOR CONDUCTING FEED
THROUGH FLASH EVAPORATORS
Frederick A. Loebel, Milwaukee, Wis., assignor to
Aqua-Chem, Inc., a corporation of Wisconsin
Filed June 20, 1960, Ser. No. 37,116
3 Claims. (Cl. 202—173)

This invention relates to evaporators and in particular to flash chamber structures for use in multi-stage evaporators.

In multi-stage evaporators such as used for providing distilled water from sea water, it is desirable to expose an effectively maximum amount of the liquid to the low pressure within each stage thereof. Maximum exposure such as by spraying the liquid into each stage would permit maximum vaporization with effectively minimum temperature drop in each stage. However, pressure differentials between successive stages, such as at the low temperature end of the evaporator, may be insufficient to permit spraying of the liquid. Conventionally, the liquid flows from stage to stage as a liquid mass and substantial portions thereof are prevented from being exposed to the low pressure of the stage through which they are passing by the mass of the liquid above those portions as they pass therethrough.

The present invention is concerned with a new and improved flash chamber structure wherein the liquid is caused to have a substantial portion of the entirety thereof exposed to the low pressure of each stage so that effectively maximized vaporization with effectively minimized temperature and pressure differentials may be effected. Thus, a principal feature of the present invention is the provision of a new and improved flash chamber structure for use in a multi-stage evaporator.

Another feature of the invention is the provision of such a flash chamber structure having new and improved means for increasing the amount of the liquid exposed at the upper surface thereof in each chamber to provide effectively maximized vaporization with effectively minimized pressure and temperature differentials.

A further feature of the invention is the provision of a flash chamber structure including means defining a first flash chamber, means defining a second flash chamber adjacent the first flash chamber, means defining a passage for conducting liquid from a bottom portion of the first flash chamber to a bottom portion of the second flash chamber, and means for agitating the liquid adjacent the passage thereby to increase the amount of the liquid exposed at the upper surface thereof in the second chamber as a result of the turbulence produced therein.

Still another feature of the invention is the provision of such flash chamber structure having new and improved means for agitating the liquid adjacent a plurality of such passages provided in a plurality of flash chamber structures of the character described.

Other features and advantages of the invention will be apparent from the following description taken in connection with the accompanying drawing wherein:

FIG. 1 is a schematic plan view of multi-stage evaporator provided with flash chamber structure embodying the invention;

FIG. 2 is an enlarged transverse section thereof taken substantially along the line 2—2 of FIG. 1;

FIG. 3 is an enlarged longitudinal section thereof taken substantially along the line 3—3 of FIG. 1; and FIG. 4 is a similar fragmentary longitudinal section of another form of evaporator structure embodying the invention.

In the exemplary embodiment of the invention as disclosed in FIGS. 1-3 of the drawing, a multi-stage evaporator generally designated 10 is shown to comprise a plurality of flash chamber structures 11 defining the successive stages of the evaporator. The structure of the flash chambers 11 may be generally similar to the structure of the flash chambers disclosed in the copending Pavelic and Goeldner application, Serial No. 40,615, filed July 5, 1960, and assigned to the assignee hereof, to which application reference may be had for a detailed description of the flash chamber structure. Broadly, however, each flash chamber structure 11 is defined by a portion of the cylindrical shell 12 of the evaporator, a central dividing partition wall means 13, and a pair of longitudinally spaced transverse walls 14. Each of the transverse walls is provided with an opening 15 in the bottom portion of the flash chamber for conducting liquid from the bottom portion of a preceding flash chamber to the bottom portion of the succeeding flash chamber. Illustratively, the liquid may comprise sea water from which fresh water is formed in the evaporator 10.

In each flash chamber 11 an upstanding wall 16 is provided extending in a downstream direction from the upstream transverse wall 14 and diagonally therefrom to abut the dividing wall 13 adjacent the downstream transverse wall of the flash chamber. Thus, wall 16 effectively defines an inlet space 17 to which the sea water brine is delivered after passing through the inlet passage 15. An orifice plate 18 may be provided to overlie space 17 and control the flow of the brine through the flash chamber for improved vaporization thereof. More specifically, the orifice plate 18 is provided with a plurality of apertures 19 through which the brine may upwardly pass, permitting the brine to flow over the orifice plate therefrom in a thin layer to expose a substantial portion thereof to the low pressure in the flash chamber. Resultingly, a substantially increased amount of vapor is delivered from the liquid to the condenser tubes 20 in the upper portion of the flash chamber.

While an improved vaporization efficiency is thusly obtained in evaporator 10, the efficiency improvement is somewhat reduced in the final stages, such as in flash chambers 11a, 11b, and 11c, due to the relatively low pressure differentials existing therein. Illustratively, the final stages of such a multi-stage flash evaporator arranged for high thermal efficiency may be less than several inches of water. The present invention comprehends the provision of means in these final stages for thoroughly mixing and agitating the brine to assure a complete flashing therein.

More specifically, as best seen in FIG. 3, an agitating means generally designated 21 is associated with each of the flash chambers 11a, 11b, and 11c. Herein, the agitating means 21 comprises an agitator blade 22 carried on the upper end of a shaft 23 driven by an electric motor 24, the shaft 23 extending through the shell 12 of the evaporator to dispose the agitator blade 22 within the lower portion of the flash chamber adjacent the downstream passage 15. Blades 22 operate to agitate thoroughly the brine thereby to increase the amount of the liquid exposed at the upper surface thereof in the flash chambers as a result of the turbulence produced therein. Thus, rather than allow only the top portion of the body of liquid passing through the flash chamber to be exposed to the low pressure in the upper portion of the flash chamber as occurs where the brine passes through in a smooth non-turbulent flow, substantially all portions of the liquid are exposed to the low pressure at the upper surface of the liquid mass in the flash chamber during some portion of the time in which they are flowing through the flash chamber.

Turning now to FIG. 4, another form of agitating means generally designated 121 for use in effecting a substantially improved vaporization in the final stages of an evaporator 110 generally similar to evaporator 10 is shown to comprise a plurality of agitator blades 122 carried on a single drive shaft 123 driven from a single motor 124. Whereas agitator blades 22 are driven about an axis perpendicular to the axis of the flow passages 15 in evaporator 10, the agitator blades 122 are driven about an axis parallel to the axis of the flow passages 15, each of these axes being coincident with the axis of shaft 123. As illustrated, the agitator blades 122 may be disposed directly in the flow passages 15 and, thus, may serve not only to effect the desirable agitation of the brine, as discussed above relative to evaporator 10, but also may effectively positively urge the brine through the final flash chambers 111a, 111b, 111c While agitating means 121 provides a somewhat more simple and economical drive of the agitating blades, the agitating means 21 provides facilitated adjustability of the agitation as each of the motors 24 may be controlled individually if desired. In all other respects, the agitating means of the different disclosed embodiments function in a generally similar manner.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In a multi-stage evaporator, flash chamber structure comprising: means defining a first flash chamber; means defining a second flash chamber adjacent said first flash chamber; means defining a passage for conducting liquid from a bottom portion of the first flash chamber to a bottom portion of the second flash chamber; and means for effectively maximizing the amount of the liquid exposed at the upper surface thereof in said chambers and concurrently urging the liquid positively through said passage from said first flash chamber to said second flash chamber, said last-named means including a fluid impeller disposed closely adjacent said passage.

2. The evaporator structure of claim 2 wherein said impeller is disposed in said first flash chamber.

3. In a multi-stage evaporator, flash chamber structure comprising: means defining a first flash chamber; means defining a second flash chamber adjacent said first flash chamber; means defining a third flash chamber adjacent said second flash chamber; means defining a first passage for conducting liquid from a bottom portion of the first flash chamber to a bottom portion of the second flash chamber; means defining a second passage for conducting liquid from a bottom portion of the second flash chamber to a bottom portion of a third flash chamber; and means for effectively maximizing the amount of the liquid exposed at the upper surface thereof in said second and third chambers, said last-named means including a first fluid impeller in said first chamber closely adjacent said first passage for agitating the fluid passing through said first passage into said second chamber, and a second impeller in said second chamber closely adjacent said second passage for agitating the fluid passing through said second passage into said third chamber, and means for driving said impellers selectively independently and concurrently.

References Cited by the Examiner
UNITED STATES PATENTS

| | | | |
|---|---|---|---|
| 1,292,577 | 1/19 | Campbell | 159—25 X |
| 1,340,653 | 5/20 | Gibson | 202—173 X |
| 1,900,789 | 3/33 | Behrens | 159—2 X |
| 2,470,521 | 5/49 | Preble | 302—14 |
| 2,944,599 | 7/60 | Frankel. | |

NORMAN YUDKOFF, Primary Examiner.

GEORGE D. MITCHELL, ALPHONSO D. SULLIVAN, RICHARD D. NEVIUS, Examiners.